United States Patent
Ma et al.

(10) Patent No.: US 8,949,644 B2
(45) Date of Patent: Feb. 3, 2015

(54) HSIC COMMUNICATION SYSTEM AND METHOD

(75) Inventors: Dong Chul Ma, Osan-si (KR); Dae Kyung Kim, Suwon-si (KR); Joon Young Shim, Seoul (KR); Ho Kyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 13/428,298

(22) Filed: Mar. 23, 2012

(65) Prior Publication Data

US 2012/0246505 A1    Sep. 27, 2012

(30) Foreign Application Priority Data

Mar. 23, 2011  (KR) .................. 10-2011-0025665

(51) Int. Cl.
*G06F 1/00* (2006.01)
*G06F 1/32* (2006.01)
*G06F 15/16* (2006.01)
*G06F 13/42* (2006.01)
*H04M 1/00* (2006.01)
*G06F 15/00* (2006.01)

(52) U.S. Cl.
CPC  *G06F 1/00* (2013.01); *G06F 15/00* (2013.01); *G06F 1/3203* (2013.01); *G06F 1/3228* (2013.01); *G06F 1/3287* (2013.01); *Y02B 60/32* (2013.01)

USPC .......... 713/324; 713/320; 709/208; 710/105; 455/574

(58) Field of Classification Search
USPC .................. 713/320, 324; 709/208; 710/105; 455/574

See application file for complete search history.

(56) References Cited

U.S. PATENT DOCUMENTS

| | | | |
|---|---|---|---|
| 7,409,567 B2* | 8/2008 | Hammes et al. | 713/320 |
| 7,738,482 B2* | 6/2010 | Thousand et al. | 370/450 |
| 7,809,969 B2* | 10/2010 | Das Sharma et al. | 713/324 |
| 7,900,070 B2* | 3/2011 | Wu et al. | 713/320 |

* cited by examiner

*Primary Examiner* — Stefan Stoynov
(74) *Attorney, Agent, or Firm* — Jefferson IP Law, LLP

(57) ABSTRACT

A High Speed Inter Chip (HSIC) system and method for minimizing power consumption by controlling the state of the HSIC module through a control line are provided. The method between a host and a slave includes transitioning, when no communication request exists for a first reference time in an active state where all functions of the HSIC modules are enabled, to a suspend state where least functions used for maintaining a communication link of the HSIC modules and transitioning, when no communication request exists for a second reference time in the suspend state, to a power-off state where the HSIC modules turn off The HSIC communication method and apparatus are advantageous to minimize the electric current consumption of the HSIC consumption system.

18 Claims, 6 Drawing Sheets

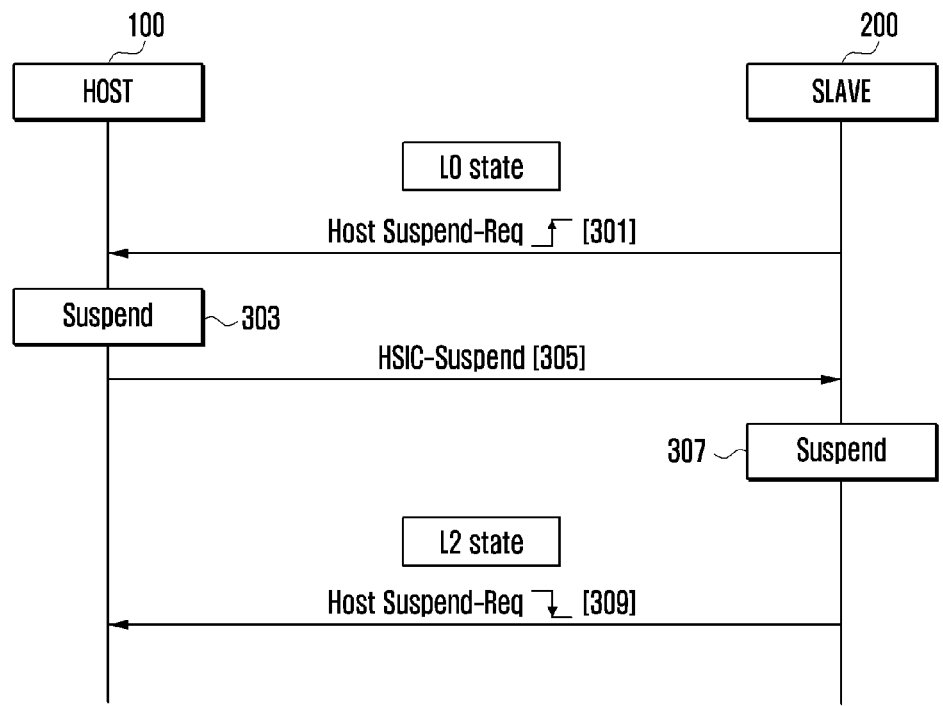
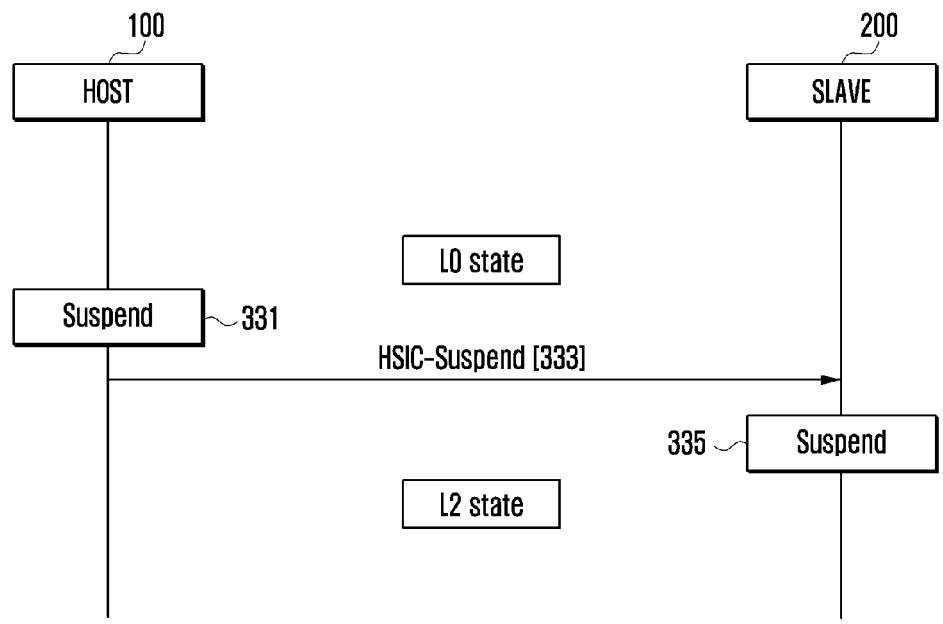

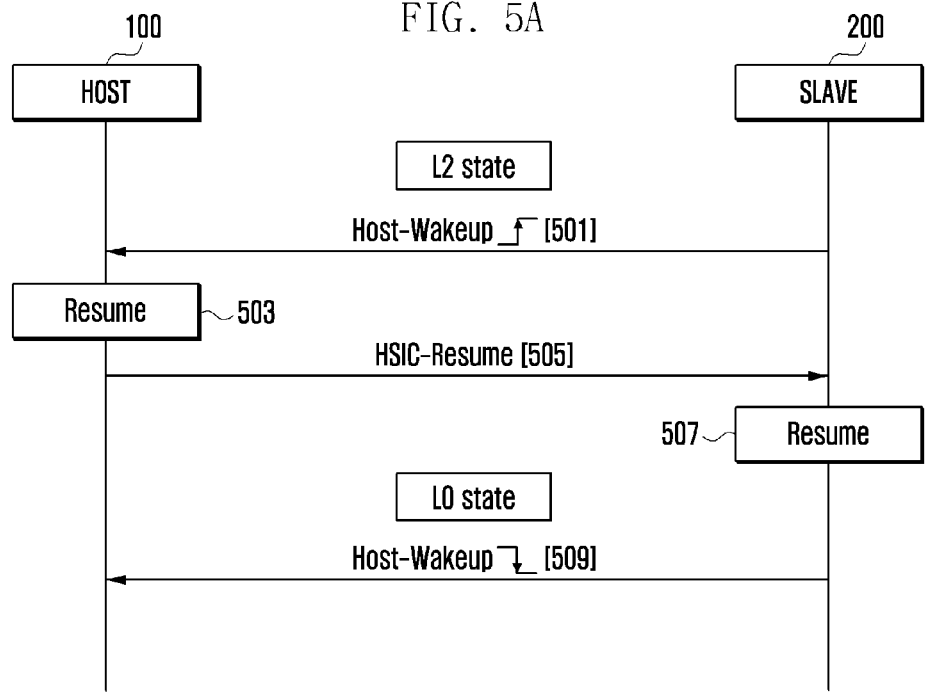
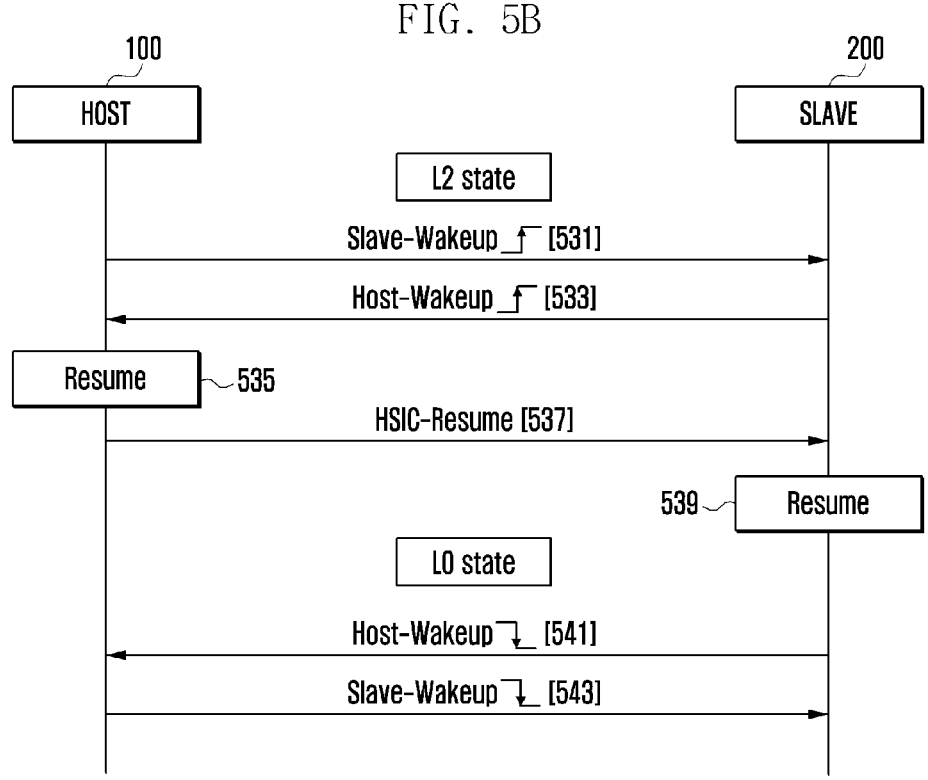

HSIC COMMUNICATION SYSTEM AND METHOD

PRIORITY

This application claims the benefit under 35 U.S.C. §119 (a) of a Korean patent application filed on Mar. 23, 2011 in the Korean Intellectual Property Office and assigned Serial No. 10-2011-0025665, the entire disclosure of which is hereby incorporated by reference.

BACKGROUND OF THE INVENTION

1. Field of the Invention

The present invention relates to a High Speed Inter Chip (HSIC) communication system and method. More particularly, the present invention relates to an HSIC system and method that is capable of minimizing power consumption by controlling the state of the HSIC module through a control line.

2. Description of the Related Art

With the advancement of information communication and semiconductor technologies, the popularity and use of mobile terminals have increased rapidly. More particularly, the latest mobile terminals have evolved to an extent where it is possible to support the mobile convergence blending various communication capabilities into a single logical set of services. More specifically, the latest mobile communication terminals are configured to support various supplementary functions, such as a broadcast playback function (e.g., Digital Multimedia Broadcasting (DMB) and Digital Video Broadcasting (DVB)), an audio playback function (e.g., a Motion Pictures Expert Group (MPEG-1 or MPEG-2) Audio Layer-3 (MP3), a photographing function, a data communication function, and Internet access functions, as well as voice communication and messaging functions of the related art.

In order to support the diverse functions, it has become normal for mobile communication terminals to be equipped with multiple chips. Typically, the communication between the chips is implemented by means of a memory (e.g., a Dual Ported Random Access Memory (DPRAM) and ONE Dynamic RAM (ONEDRAM)) or a serial interface (e.g., a Service Provider Interface (SPI), a Secure Digital Input Output (SDIO), a Mobile Industry Processor Interface (MIPI), a Host Integration Server (HIS), and the like). More recently, the latest mobile terminals adopt a High Speed Inter Chip (HSIC) interface for high data rate in inter-chip communication. HSIC is based on Universal Serial Bus (USB) technology and supports a data rate up to 480 Mbps. However, the USB technology-based HSIC has a drawback of high electric current consumption. Accordingly, the mobile terminal equipped with the HSIC consumes battery resources at a fast rate.

Therefore, a need exists for an HSIC communication system and method that is capable of minimizing electric current consumption by controlling the state of the HSIC module through a control interface.

SUMMARY OF THE INVENTION

Aspects of the present invention are to address at least the above-mentioned problems and/or disadvantages and to provide at least the advantages described below. Accordingly, an aspect of the present invention is to provide a High Speed Inter Chip (HSIC) communication system and method that is capable of minimizing electric current consumption by controlling the state of the HSIC module through a control interface.

Another aspect of the present invention is to provide an HSIC communication system and method that is capable of reducing the rate of battery consumption of the mobile terminal by minimizing the electric current consumption of the HSIC communication system.

In accordance with an aspect of the present invention, an electronic device is provided. The an electronic device including a host including a first communication module for communication, a slave including a second communication module for communication. The host includes a slave wakeup line to transmit to the slave a signal for an activation request of the second communication module, and a host active line to transmit to the slave a signal to turn on/off the second communication module. The slave includes a host wakeup line to transmit to the host a signal for an activation request of the first communication module.

In accordance with another aspect of the present invention, an HSIC communication method between a host and a slave is provided. The method includes transitioning, when no communication request exists for a first reference time in an active state where all functions of the HSIC modules are enabled, to a suspend state where least functions used for maintaining a communication link of the HSIC modules, and transitioning, when no communication request exists for a second reference time in the suspend state, to a power-off state where the HSIC modules turn off Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 3A and 3B illustrate procedures of state transition of HSIC modules from an active state to a suspend state according to an exemplary embodiment of the present invention;

FIGS. 5A and 5B illustrate procedures of state transition of HSIC modules from a suspend state to an active state according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
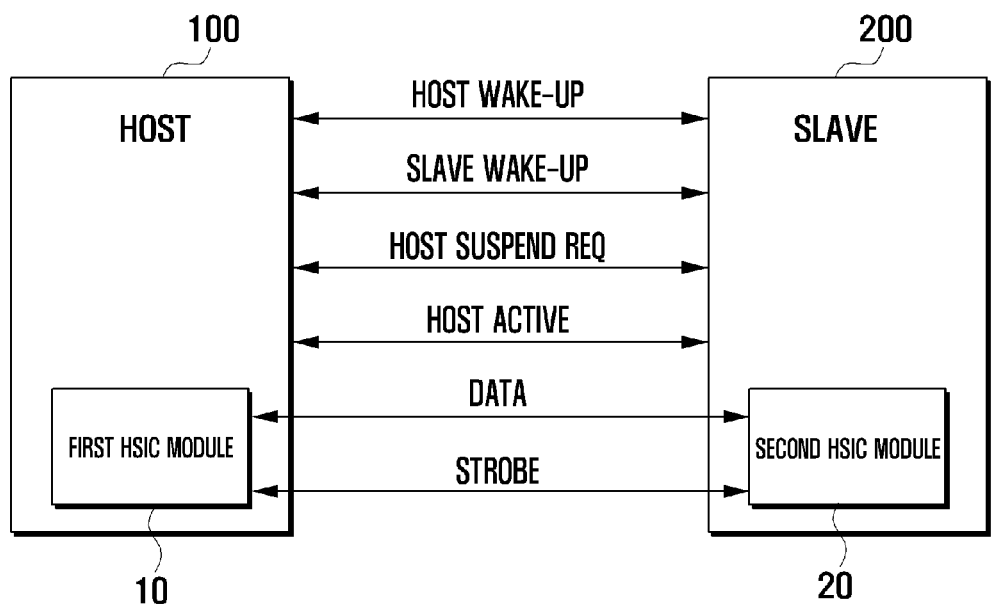
FIG. 1 is a schematic diagram illustrating a configuration of a High Speed Inter Chip (HSIC) communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustrative purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the following description, the term "active state" denotes the state where the High Speed Inter Chip (HSIC) module is activated for communication between chips, the term "suspended state" denotes the state where only the least function for maintaining the communication link of the HSIC is activated, and the term "power-off state" is the state where the power supply to the HSIC is blocked. If data transfer is requested in the power-off state, an initial process should be performed to power on the HSIC module and establish the communication link.

FIGS. 1 through 6B, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 2:
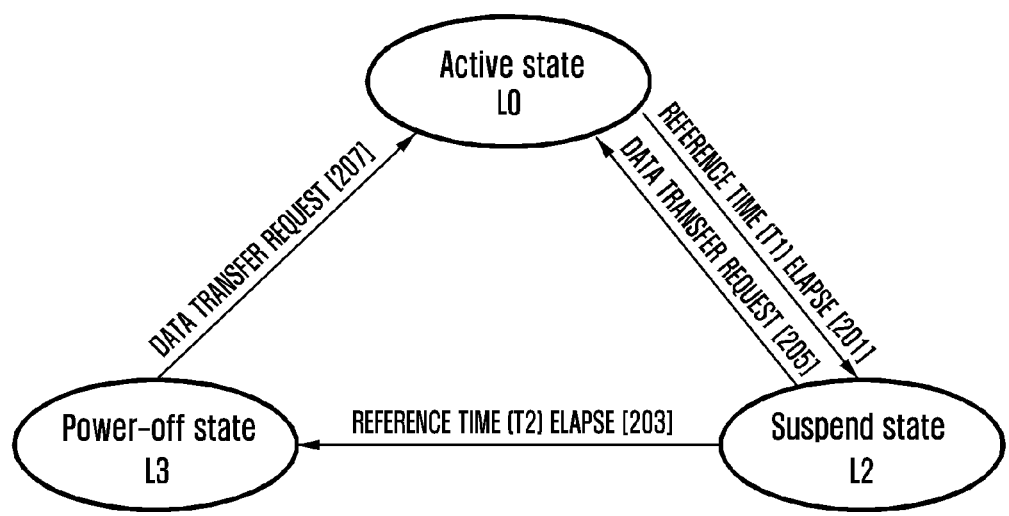
FIG. 2 is a state transition diagram illustrating transition of a state of an HSIC module according to an exemplary embodiment of the present invention.

FIG. 1 is a schematic diagram illustrating a configuration of an HSIC communication system according to an exemplary embodiment of the present invention, and FIG. 2 is a state transition diagram illustrating transition of a state of an HSIC module according to an exemplary embodiment of the present invention.

Referring to FIGS. 1 and 2, the HSIC communication system includes a host 100 and a slave 200. The host 100 includes a first HSIC module 10 for high speed inter-chip communication, and the slave 200 includes a second HSIC module 20.

As aforementioned, the HSIC communication interface is the communication interface based on the Universal Serial Bus (USB) 2.0 standard for high speed data transfer. Recently, HSIC is a promising communication interface due to the advantage of its high speed data rate.

The host 100 is the main chip of the HSIC communication system and can be an Application Processor (AP). The slave is the sub chip of the HSIC communication system and can be a Communication Processor (CP) responsible for processing communication.

The HSIC communication system according to an exemplary embodiment of the present invention can further include a data line (DATA) for data transfer according to the HSIC communication interface standard, a host wake-up line (HOST WAKE-UP) to request activation of the first HSIC module 10 in addition to a strobe line (STROBE), a slave wake-up line (SLAVE WAKE-UP) to request activation of the second HSIC module 20, a host suspend request line (HOST SUSPEND REQ) to request transition to the suspend state, and a host active line (HOST ACTIVE) for controlling power on/off of the second HSIC module 20. These lines are established by connecting the General Purpose Input/Output (GPIO) nodes of the host 100 and slave 200.

The HSIC communication system can control the states of the first HSIC module 10 and the second HSIC module 20 to minimize the power consumption. More specifically, the HSIC communication system can control the first and second HSIC modules 10 and 20 to operate in one of an Active State (L0), a Suspend State (L2), and a Power-off State (L3) as shown in FIG. 2. The active state (L0) is the state where all the functions of the first and second HSIC modules 10 and 20 are activated. The suspend state (L2) is the state where some of the functions of the first and second HSIC modules 10 and 20 reduce power consumption when no data is transmitted while the least functions are activated for maintaining the HSIC communication link. The power-off state (L3) is the state where the power supply to the first and second HSIC modules 10 and 20 is blocked.

Referring to FIG. 2, if no communication request (e.g., a data transfer request) is detected for a predefined first reference time (T1) in the active state (L0), the state of the first and second HSIC modules 10 and 20 can transition from the active state (L0) to the suspend state (L2) as denoted by reference number 201. If no communication request (e.g., data transfer request) is detected for a predefined second time (T2) in the suspend state (L2), the state of the first and second HSIC modules 10 and 20 can transition from the suspend state (L2) to the power-off state (L3) as denoted by reference number 203. If the communication request is detected in the suspend state (L2), the state of the first and second HSIC modules 10 and 20 can transition from the suspend state (L2) to the active state (L0) as denoted by reference number 205. If the communication request is detected in the power-off state (L3), the state of the first and second HSIC modules 10 and 20 can transition from the power-off state to the active state (L0) as denoted by reference number 207. The first and second reference times T1 and T2 can be set to the same value or different values.

In order to transition from the active state (L0) to the power-off state (L3), the state of the first and second HSIC modules 10 and 20 has to transition to the suspend state (L2) first. This is to prevent the data from being lost in the middle of transmission due to the abrupt power-off to the first and second HSIC modules 10 and 20.

Exemplary embodiments of the present invention can be applied to all the types of terminals supporting high data transfer between inner chips. More particularly, exemplary embodiments of the present invention are advantageous to the power-constraint mobile devices, such as a mobile communication terminal, a tablet Personal Computer (PC), a Portable Multimedia Player (PMP), a navigation terminal, a Smartphone, an electronic book, an electronic dictionary, a laptop computer, a netbook, and an Ultra Mobile Personal Computer (UMPC).

The configuration of the HSIC communication system and state transition of the HSIC modules have been described schematically. The state transition of the HSIC module is described below.

FIGS. 3A and 3B illustrate procedures of state transition of HSIC modules from an active state to a suspend state according to an exemplary embodiment of the present invention.

Referring to FIGS. 1 through 3B, if there is no communication request detected in the active state (L0) for the first reference time, the slave 200 or the host 100 can request transition to the suspend state (L2). FIG. 3A is the signaling diagram illustrating the slave-triggered state transition from the active state to the suspend state, and FIG. 3B is the signaling diagram illustrating the host-triggered state transition from the active state to the suspend state.

Referring to FIG. 3A, if no communication request (e.g., a data transfer request) is detected for the first reference time (T1) after the communication has completed in the active state, the slave 200 of the HSIC communication system can send the host 100 a signal requesting for transition to the suspend state (L2) in step 301. At this time, the slave 200 can enable a host suspend request line (Host-Suspend-Req). Here, to enable means to change the signal from low state to high state on the signal line. If the host suspend request line is enabled, the host 100 controls the first HSIC module 10 to transition from the active state (L0) to the suspend state (L2) in step 303 and send a suspend command (HSIC-Suspend) to the second HSIC module 20 of the slave 200 according to the HSIC communication standard in step 305. More specifically, the first HSIC module 10 switches the data line (DATA) to Low state and the strobe line (STROBE) to High state.

Upon receipt of the HSIC-Suspend, the second HSIC module 200 of the slave transitions to the suspend state (L2) in step 307. Thereafter, the slave 200 sends the host 100 a host suspend request (Host Suspend-Req) to disable the host suspend request line in step 309. In this manner, the state of the first and second HSIC modules 10 and 20 transition from the active state (L0) to the suspend state (L2). As described above, the slave 200 can request the host 100 for the transition to the suspend state (L2) to reduce power consumption of the HSIC communication system.

Referring to FIG. 3B, if no communication request is detected for the first reference time (T1) after the communication has completed in the active state, the host 100 of the HSIC communication system controls the first HSIC module 10 to transition to the suspend state (L2) in step 331 and sends the suspend command (HSIC-Suspend) to the second HSIC module 20 of the slave 200 in step 333. More specifically, the first HSIC module 10 switches the data line (DATA) to Low state and the strobe line (STROBE) to high state.

Upon receipt of the HSIC-Suspend, the second HSIC module 20 of the slave 200 transitions to the suspend state (L2) in step 335. In this manner, the first and second HSIC modules 10 and 20 transition from the active state (L0) to the suspend state (L2).

Figure 4:
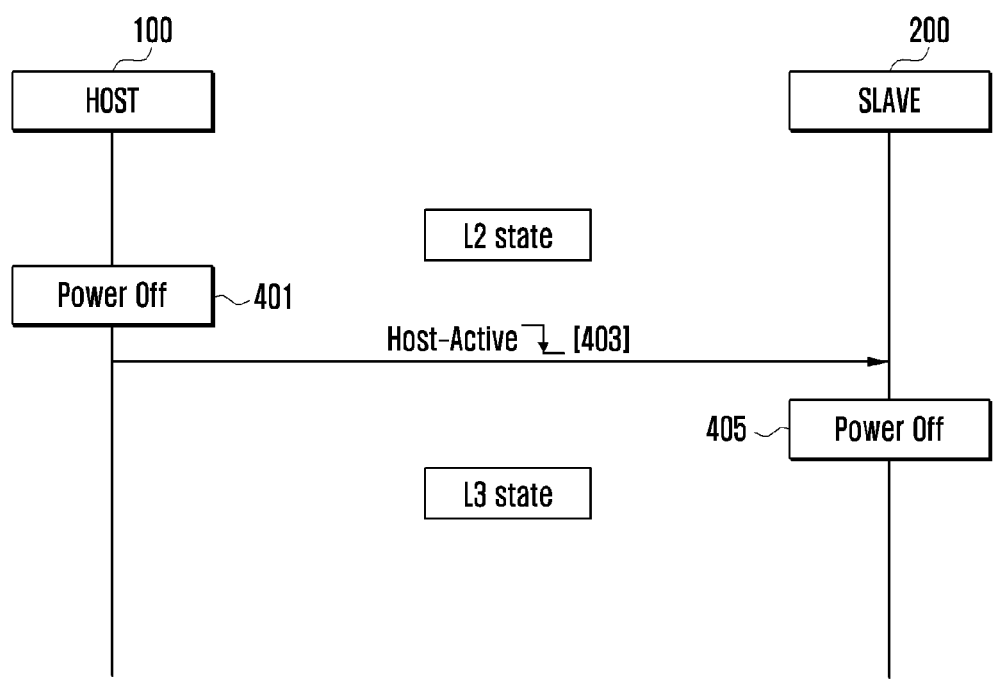
FIG. 4 illustrates procedures of state transition of HSIC modules from a suspend state to a power-off state according to an exemplary embodiment of the present invention.

FIG. 4 illustrates procedures of state transition of HSIC modules from a suspend state to a power-off state according to an exemplary embodiment of the present invention.

Referring to FIGS. 1, 2, and 4, if there is no communication request (e.g., a data transfer request) detected in the suspended state (L2) for the second reference time, the host 100 turns off (or blocks) the power to the first HSIC module 10 to transition to the power-off state (L3) in step 401. Thereafter, the host 100 sends the slave 200 a signal (Host-Active) requesting for transition to the power-off state (L3) in step 403. For this purpose, the host 100 can disable the host active line controlling power on/off of the second HSIC module 20. Upon receipt of the power-off state transition request signal, the slave 200 turns off (or blocks) the power to the second HSIC module 20 to transition to the power-off state (L2) in step 405. In this manner, the first and second HSIC modules 10 and 20 can transition from the suspend state (L2) to the power-off state (L3). Since the first and second HSIC modules 10 and 20 transition to the power-off state when there is no communication between the host 100 and the slave 200, the HSIC communication system is capable of reducing the unnecessary power consumption for maintaining the communication between the host 100 and slave 200.

FIGS. 5A and 5B illustrate procedures of state transition of HSIC modules from a suspend state to an active state according to an exemplary embodiment of the present invention.

Referring to FIGS. 1, 2, 5A, and 5B, if a communication request (e.g., a data transfer request) is detected in the host 100 or the slave 200 after the first and second HSIC modules 10 and 20 have transitioned to the suspend module (L2), the host 100 and the slave 200 can control the first and second HSIC modules 10 and 20 to transition to the active state (L0). FIG. 5A is the signaling diagram illustrating the slave-triggered state transition from the suspend state to the active state, and FIG. 5B is the signaling diagram illustrating the host-triggered state transition from the suspend state to the active state.

Referring to FIG. 5A, if a communication request is detected in the suspend state (L2), the slave 200 sends a host wakeup request signal (Host-Wakeup) to the first HSIC module 10 to request activation of the first HSIC module 10 in step 501. For this purpose, the slave 200 can enable the host wakeup line (Host-Wakeup). Upon receipt of the host wakeup request signal, the host 100 resumes the suspended functions of the first HSIC module 10 to transition the first HSIC module 10 from the suspended state (L2) to the active state (L0) in step 503 and sends a function resume request command (HSIC-Resume) to the second HSIC module 20 of the slave 200 according to the HSIC communication standard in step 505. More specifically, the first HSIC module 10 switches the data line (DATA) to High state and the strobe line (STROBE) to Low state.

Upon receipt of the communication resume command, the second HSIC module 20 of the slave 200 resumes its suspended functions to transition to the active state (L0) in step 507. After the second HSIC module 20 has transitioned to the active state (L0), the slave 200 can disable the host wake up line (Host-Wakeup) in step 509. Once both the first and second HSIC modules 10 and 20 transition to the active state (L0), the slave 200 transmits the requested data to the host 100 by means of the second HSIC module 20.

Referring to FIG. 5B, if a communication request is detected in the suspend state (L2), the host 100 sends a slave wakeup request signal (Slave-Wakeup) to the slave 200 to request activation of the second HSIC module 20 in step 531. For this purpose, the host 100 can enable the slave wakeup line (Slave-Wakeup). Upon receipt of the slave wakeup request signal, the slave 200 sends the host 100 a host resume request signal to request activation of the first HSIC module 10 in step 533. For this purpose, the slave 200 can enable the host wakeup line (Host-Wakeup). Upon receipt of the host wakeup request signal, the host 100 controls the first HSIC module 10 to resume its suspended functions to transition from the suspend state (L2) to the active state (L0) in step 535 and send a communication resume command (HSIC-Resume) to the second HSIC module 20 of the slave 200 in step 537.

Upon receipt of the communication resume command, the second HSIC module 20 resumes its suspended functions to transition from the suspend state (L2) to the active state (L0) in step 539. After the second HSIC module 20 has transitioned to the active state (L0), the slave 200 can disable the host wakeup line (Host-Wakeup) in step 541. The host 100 can also disable the slave wakeup line (Slave-Wakeup) in step 543. Once both the first and second HSIC modules 10 and 20 transition to the active state (L0), the host 100 can transmit the request data to the slave 200 by means of the first HSIC module 10.

Figure 6A:
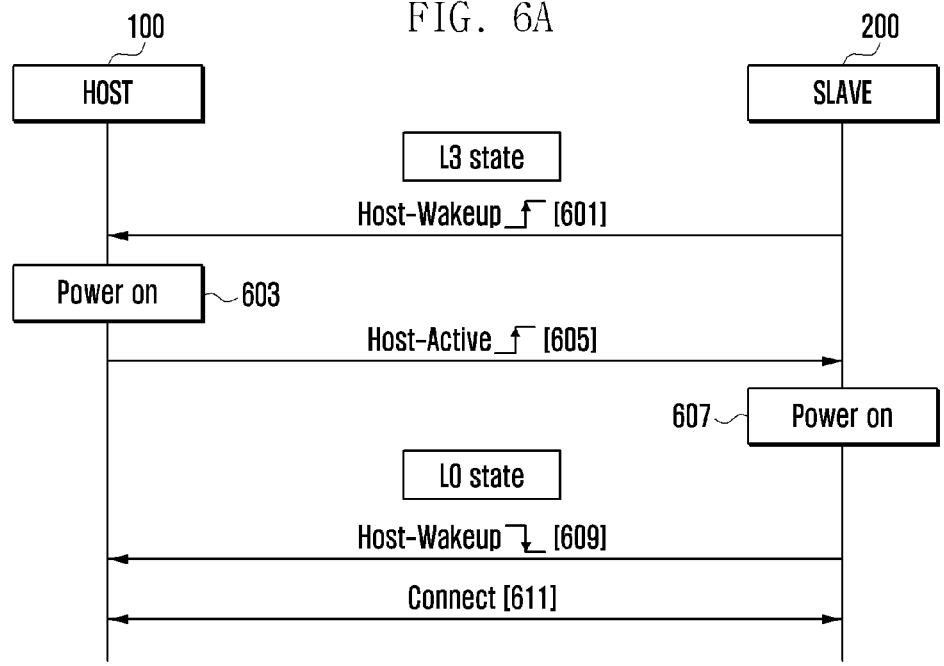
FIGS. 6A and 6B illustrate procedures of state transition of HSIC modules from a power-off state to an active state according to an exemplary embodiment of the present invention.
Figure 6B:
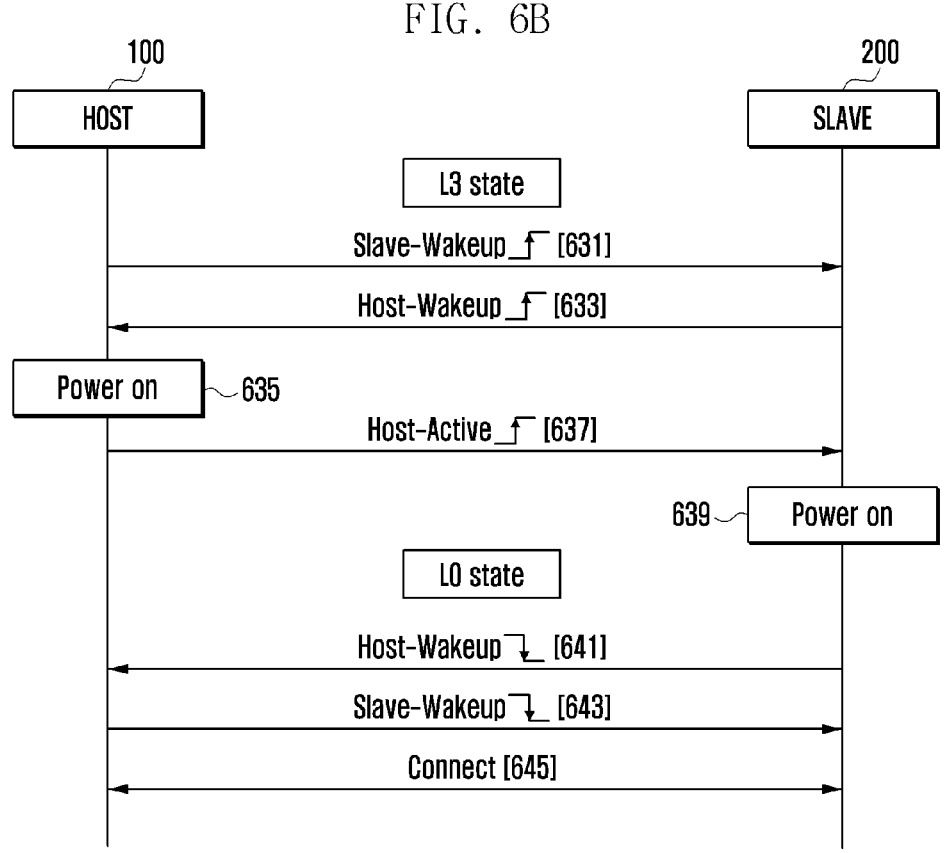

FIGS. 6A and 6B illustrate procedures of state transition of HSIC modules from a power-off state to an active state according to an exemplary embodiment of the present invention.

Referring to FIGS. 1, 2, 6A, and 6B, if a communication request is detected in the host 100 or the slave 200 while the first and second HSIC modules 10 and 20 are in the power-off state (L3), the host 100 and the slave 200 can control the first and second HSIC modules 10 and 20 to transition to the active state (L0). FIG. 6A is the signaling diagram illustrating the slave-triggered state transition from the power-off state to the active state, and FIG. 6B is the signaling diagram illustrating the host-triggered state transition from the power-off state to the active state.

Referring to FIG. 6A, if the communication request is detected in the power-off state (L3), the slave 200 sends a HSIC module activation request signal (Host-Wakeup) to the host 100 in step 601. For this purpose, the slave 200 can enable the host wakeup line (Host-Wakeup). Upon receipt of the HSIC module activation request signal, the host 100 turns on the power of the first HSIC module 10 to transition from the power-off state (L3) to the active state (L0) in step 603 and sends an HSIC module power-on request signal to the slave 200 in step 605. For this purpose, the host 100 can enable the host active line (Host-Active).

Upon receipt of the HSIC module power-on request signal, the slave 200 turns on the second HSIC module 20 to transition from the power-off state (L3) to the active state (L0) in step 607. Once the second HSIC module 20 enters the active state (L0), the slave 200 can disable the host wakeup line (Host-Wakeup) in step 609. After transitioning to the active state (L0), the first and second HSIC modules 10 and 20 perform the initialization process to establish the communication link according to the HSIC communication standard in step 611. Since the initialization procedure is specified in the HSIC communication standard, detailed description thereon is omitted herein. Once the initialization completes, the slave 200 can transmit the request data to the host 100 by means of the second HSIC module 20.

Referring to FIG. 6B, if a communication request is detected in the power-off state (L3), the host 100 sends an HSIC module activation request signal (Slave-Wakeup) to the slave 200 in step 631. For this purpose, the host 100 can enable the slave wakeup line (Slave-Wakeup). Upon receipt of the HSIC module activation request signal, the slave 200 sends a HSIC activation request signal (Host-Wakeup) to the host 100 in step 633. For this purpose, the slave 200 can enable the host wakeup line (Host-Wakeup). Upon receipt of the HSIC activation request signal, the host 100 turns on the power of the first HSIC module 10 to transition from the power-off state (L3) to the active state (L0) in step 635 and sends an HSIC activation request signal to the slave 200 in step 637. For this purpose, the host 100 can enable the host active line (Host-Active).

Upon receipt of the HSIC activation request signal, the slave 200 turns on the power of the second HSIC module 20 to transition from the power-off state (L3) to the active state (L0) in step 639. Once the second HSIC module 20 enters the active state (L0), the slave 200 can disable the host wakeup line (Host-Wakeup) in step 641. In addition, the host 100 can disable the slave wakeup line (Slave-Wakeup) in step 643.

Once both the first and second HSIC modules 10 and 20 power on, the first and second HSIC modules 10 and 20 perform the initialization process to establish a communication link according to the HSIC communication standard in step 645. After the initialization process completes, the host 100 can transmit the requested data to the slave 200 by means of the first HSIC module 10.

The above-described exemplary HSIC communication method of the present invention can be implemented in the form of computer-executable program commands and stored in a computer-readable storage medium. The computer readable storage medium can store the program commands, data files, and data structures in individual or combined forms. The program commands recorded in the storage medium can be designed and implemented for the present invention or used by those skilled in the computer software field.

The computer-readable storage medium includes a magnetic media, such as a floppy disk and a magnetic tape, an optical media including a Compact Disc (CD) Read Only Memory (ROM) and a Digital Video Disc (DVD) ROM, a magneto-optical media, such as a floptical disk, and the hardware device designed for storing and executing program commands, such as ROM, Random Access Memory (RAM), and flash memory. The program commands include the language code executable by computers using the interpreter as well as the machine language codes created by a compiler. The aforementioned hardware device can be implemented with one or more software modules for executing the operations of the present invention.

As described above, the exemplary HSIC communication system and method of the present invention controls the HSIC modules to transition to the suspend state when no data communication occurs over a predefined period in the active state and to the power-off state when no data communication occurs over a predefined time in the suspend state, resulting in minimization of power consumption of the HSIC communication system. In addition, the HSIC communication and method of the present invention is capable of reducing the rate of battery consumption of the mobile terminal adopting the improved HSIC communication system and method.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising:
 a host comprising a first communication module for communication;
 a slave comprising a second communication module for communication; and
 wherein the host comprises:
  a slave wakeup line to transmit to the slave a signal for an activation request of the second communication module, and a host active line to transmit to the slave a signal to turn on/off the second communication module; and wherein the slave comprises:

a host wakeup line to transmit to the host a signal for an activation request of the first communication module.

2. The device of claim 1, wherein the host, when a communication request to the slave is detected in a power-off state of the first communication module, transmits to slave the signal for the activation request of the second communication module via the slave wakeup line, turns on the first communication module and transitions to an active state when the signal for the activation request for the first communication module is received from the slave, and transmits to the slave a signal for a power-on request for the second communication module via the host active line.

3. The device of claim 1, wherein the slave, when a communication request to the host is detected in the power-off state of the second communication module, transmits the to the host the signal for the activation request of the first communication module via the host wakeup line, and wherein the slave turns on the second communication module and transitions the second communication module to an active state when a signal for a power-on request for the second communication module is received via the host active line.

4. The device of claim 1, further comprising a timer for counting time, wherein the host, when the host determines that no communication request exists for a first reference time in an active state of the first communication module using the timer, transitions the first communication module to a suspend state where functions are used for maintaining a communication link of a first communication module, and controls the first communication module to transmit to the second communication module a suspend command for transiting to the suspend state, wherein the host, when the host determines that no communication request exists for a second reference time in the suspend state of the first communication module using the timer, turns off the first communication module and transitions the first communication module to the power-off state, and transmits to the slave the signal for a power-off request of the second communication module via the host active line, wherein the second communication module transitions to the suspend state when the suspend command is received, and wherein the slave controls the transition of the second communication module to the power-off state when the signal for the power-off request is received.

5. The device of claim 4, wherein the slave further comprises a suspend request line to transmit the signal for a transition request for the first communication module to transition to the suspend state, and, when the slave determines that no communication request exists for a first reference time in the active state of the second communication module using the timer, transmits to the host the signal for the transition request for the first communication module to transition to the suspend state via the suspend request line, and wherein the second communication module transitions to the suspend state when the suspend command is received from the host.

6. The device of claim 1, wherein the host, when the communication request to the slave is detected in a suspend state of the first communication module, transmits the signal for an activation request for the second communication module via the slave wakeup line, and wherein the host resumes a stopped function of the first communication module and transitions the first communication module to an active state, and transitions the second communication module to the active state by transmitting to the second communication module a communication resume command for resuming the functions of the second communication module when the signal for the activation request for the first communication module is received from the slave via the host wakeup line.

7. The device of claim 1, wherein the slave, when a communication request to the host is detected in a suspend state of the second communication module, transmits the signal for the activation request for the first communication module via the host wakeup line, and wherein the second communication module resumes the stopped functions and transitions to an active state when the resume command for functions of the second communication module is received from the host.

8. The device of claim 1, wherein the host is an application processor.

9. The device of claim 1, wherein the slave is a communication processor.

10. The device of claim 1, wherein the first module and the second module are a HSIC module.

11. A communication method between a host and a slave, the method comprising:

transmitting, when the host detects a communication request to the slave while a first communication module included in the host and a second communication module included in the slave are in a power-off state, to the slave a signal for an activation request of the second communication module via a slave wakeup line;

transmitting by the slave to the host a signal for an activation request for the first communication module via a host wakeup line as a response to the signal for the activation request for the second communication module;

turning on the first communication module by the host as the response to the signal for an activation request for the first communication module; and turning on the second communication module by transmitting to the slave a signal for a power-on request for the second communication module via a host active line.

12. The method of claim 11, further comprising:

transmitting, when the slave detects a communication request of the host while the second communication module is in the power-off state, to the host the signal for an activation request for the first communication module via the host wakeup line;

turning on the first communication module by the host as a response to the signal for the activation request for the first communication module;

transmitting by the host to the slave the signal for the power-on request for the second communication module via the host active line; and turning on the second communication module by the slave as a response to the signal for the power-on request for the second communication module.

13. The method of claim 11, further comprising:

requesting, when no communication request exists for a first reference time in an active state of the second communication module, a transition of the first communication module to a suspend state by the slave via a host suspend request line;

transitioning the first communication module to the suspend state by the host as a response to the request;

transmitting by the first communication module to the second communication module a suspend command for the transition to a suspend state; and transitioning the second communication module to the suspend state when the suspend command is received.

14. The method of claim 13, further comprising:

turning off, when no communication request exists for a second reference time in the suspend state of the first communication module, the first communication module by the host;

transmitting by the host the signal for a power-off request for the second communication module via the host active line; and turning off the second communication module by the slave as a response to the signal for the power-off request.

15. The method of claim 11, further comprising:

requesting, when a communication request with the host is detected in a suspend state of the second communication module by the slave an activation of the first communication module via a host wakeup line;

transitioning the first communication module to the active state by resuming a function of the first communication module by the host as a response to the activation request of the first communication request;

transmitting, when the first communication module transitions to the active state, to the second communication module by the host a communication resume command of a function of the second communication module; and transitioning to the active state by the second communication module resuming the function as a response to a communication resume command.

16. The method of claim 11, further comprising:

requesting, when the communication request to the slave is detected in a suspend state of the first communication module, the activation of the second communication module by the host via the slave wakeup line;

requesting, when the second communication module is activated, the activation of the first communication module by the slave via the host wakeup line;

transitioning the first communication module to the active state by resuming the function of the first communication module by the host;

transmitting, when the first communication module transitions to an active state, by the host to the second communication module a communication request for resuming the functions of the second communication module; and transitioning to the active state by resuming the function of the second communication module as a response to the communication resume command.

17. The method of claim 11, wherein the first communication module and the second communication module are a HSIC module.

18. The method of claim 11, wherein the host is an application processor and the slave is a communication processor.

* * * * *